Feb. 25, 1941.  E. O. SHREFFLER  2,233,086
SPEEDOMETER COUPLING
Filed April 6, 1940
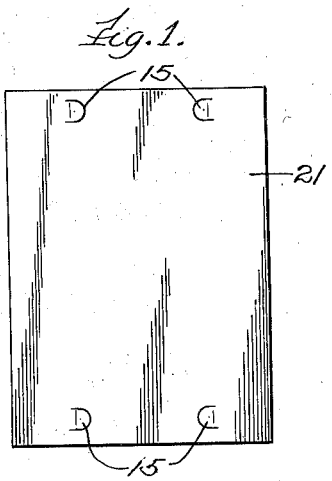
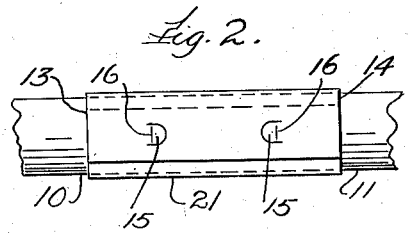
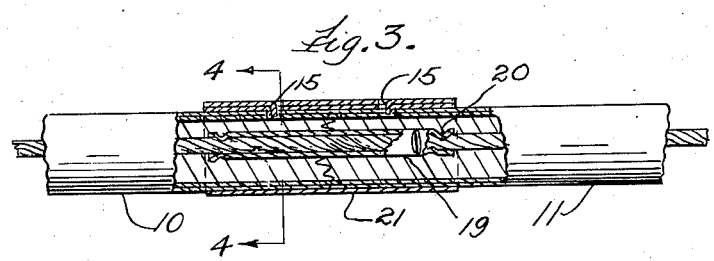
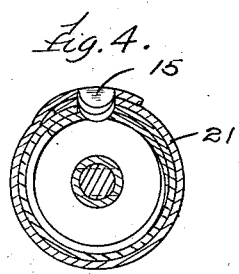
Inventor
Elwyne O. Shreffler
by James R. McKnight
his Attorney Patented Feb. 25, 1941

2,233,086

UNITED STATES PATENT OFFICE 2,233,086

SPEEDOMETER COUPLING

Elwyne O. Shreffler, Kankakee, Ill.

Application April 6, 1940, Serial No. 328,183

1 Claim. (Cl. 138—99)

This invention relates to a means for the repair of broken speedometer cables and housings so as to save replacement of the same.

There are approximately 200 different speedometer cables in use on various models of automobiles, and about 150 different speedometer housings. It is therefore impossible for the average dealer or repair shop proprietor to carry the great number of speedometer cables and housings required for replacement on different cars of various years.

Broken speedometer housings and cables are usually replaced, and delay is often caused because the proper housing or cable has to be ordered and shipped from the factory.

It is the object of this invention to provide means whereby a broken speedometer housing or cable may be repaired within a very short time so that replacement is not necessary. My invention contemplates a coupling adapted to attach the broken ends of a speedometer housing or cable so that the same may be again used, and such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Referring to the drawing, Fig. 1 is a detailed view of a blank from which my coupling for the housing is formed; Fig. 2 is a front elevational view of the coupling in place on a repaired housing; Fig. 3 is a view partly in section of my coupling, as shown in Figs. 1 and 2, in place and Fig. 4 is a sectional view on line 4—4 of Fig. 3.

For the purpose of illustrating my invention let us assume a speedometer housing with portions 10 and 11, separated by a break. I provide a coupling 12 in the form of a hollow tube, into one open end 13 of which I insert one of the broken ends 10 of the speedometer housing. Into the other open end 14 of the coupling 12 I insert the other broken end 11 of the housing. The ends 10 and 11 are inserted so as to meet within the coupling 12.

My coupling 12 may be made of metal or any other suitable material. On either side at substantially half-way between the outer edges and the center of the coupling 12 inwardly extending semi-circular portions 15 are cut through the metal. These portions 15 are bent inwardly on lines 16 to form ears and bear against portions 10 and 11 of the speedometer housing to prevent their accidental withdrawal from the coupling 12.

In this repair of the speedometer housing it is not even necessary to remove the housing from the car. The work may all be done by merely joining the loose separated ends as heretofore described. The saving of labor and costs will readily be appreciated. There is repair instead of replacement with maximum savings of time and without loss of efficiency of the repaired parts.

My coupling is particularly useful in those instances where the speedometer coupling is not broken, but the speedometer housing is broken because, I form my coupling 12 from a blank 21, as shown in Fig. 1. The four semi-circular portions 15 are cut through the metal so as to interengage, as shown in Fig. 4, when the coupling is around the joined broken ends 10 and 11 of the speedometer housing.

Having thus described my invention, I claim:

A construction for repairing a speedometer housing having portions separated by a break comprising a blank, said blank having a pair of spaced cut through semi-circular portions adjacent the top portion of the blank and another pair of spaced cut through semi-circular portions adjacent the bottom portion of the blank, said blank adapted to be rolled to form a hollow tube with opposite open ends and with the top portion of the blank overlapping the bottom portion so that each of the semi-circular portions of the top portion is positioned directly above a corresponding semi-circular portion on the bottom portion of the blank, one open end of the tube so formed adapted to receive one of the separated portions of the speedometer housing, and the other open end of said tube adapted to receive the other separated portion of the speedometer housing so that the ends of said separated portions connect within the tube, said upper semi-circular portions bent downwardly and inwardly and interengaging with the also downwardly and inwardly bent lower semi-circular portions to hold the blank in tube position, said semi-circular portions bearing at their ends against the portions of the speedometer housing to prevent their accidental withdrawal from the tube.

ELWYNE O. SHREFFLER.